United States Patent
Kim

(10) Patent No.: US 9,157,778 B2
(45) Date of Patent: Oct. 13, 2015

(54) GAS FLOW METER AND METHOD FOR MEASURING VELOCITY OF GAS

(75) Inventor: Sung-Won Kim, Gangwon-do (KR)

(73) Assignee: Jeong-Ik Park, Seoul (KR)

( * ) Notice: Subject to any disclaimer, the term of this patent is extended or adjusted under 35 U.S.C. 154(b) by 20 days.

(21) Appl. No.: 13/885,795

(22) PCT Filed: Nov. 16, 2010

(86) PCT No.: PCT/KR2010/008117
§ 371 (c)(1),
(2), (4) Date: May 16, 2013

(87) PCT Pub. No.: WO2012/067281
PCT Pub. Date: May 24, 2012

(65) Prior Publication Data
US 2013/0228689 A1   Sep. 5, 2013

(51) Int. Cl.
*G01F 1/66*   (2006.01)
*G01F 1/704*   (2006.01)
*G01F 1/74*   (2006.01)
*G01F 1/708*   (2006.01)

(52) U.S. Cl.
CPC *G01F 1/661* (2013.01); *G01F 1/66* (2013.01); *G01F 1/704* (2013.01); *G01F 1/7086* (2013.01); *G01F 1/74* (2013.01)

(58) Field of Classification Search
CPC .................................. G01F 1/661; G01F 1/704
USPC .......... 250/341.1, 338.1, 339.13, 343; 73/861
See application file for complete search history.

(56) References Cited

U.S. PATENT DOCUMENTS

2006/0262311 A1*   11/2006   Muta et al. ..................... 356/437
2011/0302992 A1*   12/2011   Robbins et al. ................ 73/23.3

FOREIGN PATENT DOCUMENTS

| JP | 05297011 | 11/1993 |
|---|---|---|
| JP | 2003-130703 | 5/2003 |
| JP | 2005160944 | 6/2005 |
| JP | 2008170394 | 7/2008 |
| KR | 101022317 | 3/2011 |

OTHER PUBLICATIONS

International Search Report mailed Aug. 29, 2011 for PCT/KR2010/008117.

* cited by examiner

*Primary Examiner* — David Porta
*Assistant Examiner* — Meenakshi Sahu
(74) *Attorney, Agent, or Firm* — Hauptman Ham, LLP

(57) ABSTRACT

Disclosed are a gas flow meter and a method for measuring the velocity of gas, wherein the reliability of real time measurement may be improved and a specific gas may be selected and measured. The gas flow meter includes: at least a gas detecting section for radiating light having a wavelength that is absorbed by a specific gas to the specific gas, of which flow velocity is to be measured, in a mixture gas including at least one gas, detecting the irradiance absorption of the corresponding wavelength of the specific gas, and providing a detection signal corresponding to the detected irradiance and a control section for calculating the flow velocity of the specific gas to be measured in real time based on the detection signal, which is provided from the gas detection section.

10 Claims, 7 Drawing Sheets

Flow of gas (Disturbance)

[Fig. 10]

GAS FLOW METER AND METHOD FOR MEASURING VELOCITY OF GAS

FIELD OF THE INVENTION

The present invention relates, in general, to a gas flow meter, more particularly, to a gas flow meter and a method for measuring the velocity of gas which ensures the reliability of the measuring and selective measuring on the velocity of particular gas only.

DESCRIPTION OF THE RELATED ART

In general, the measuring of gas flow volume is measured by multiplying the measured gas flow velocity and the moving distance of gas per unit hour, and the flow cross section at the spot of velocity measuring. In addition, in case of flow of mixture of gases, a method of measuring the flow volume of particular gas is to calculate by deriving the rate of said particular gas out of the entire flow volume by measuring the concentration of said particular gas out of entire gas.

The types of the gas flow meter which are mainly used at present are the differential pressure type, turbine type, area type, ultrasonic type and electronic flow meter.

The FIG. 1 is a concept diagram which shows the type and operation method of general flow meter.

A differential pressure type flow meter measures the pressure difference occurred at the both ends of the blocking diaphragm and converts it to the flow velocity by blocking the cross section of the pipe wherein the fluid flows as depicted in FIG. 1-(a) with the blocking diaphragm with created passing holes.

A turbine type flow meter measures the revolving speed of rotor depending on the fluid flow and converts it to the flow velocity by installing the rotor at the center of pipe wherein the fluid flows as depicted in FIG. 1-(b).

An area flow meter measures the elasticity displacement amount created by the flow velocity by installing the elastic displacement meter along the fluid flow direction as depicted in FIG. 1-(c), otherwise measure the displacement on the displacement meter created by competing the pressure from the flow velocity and gravity by installing the displacement meter at the funnel type channel and converts it to the flow velocity.

An ultrasonic flow meter measures the amount of ultrasonic velocity change depending on the flow velocity by using the transmitting speed difference of ultrasonic wave corresponding to the flow velocity as depicted in FIG. 1-(d) and converts it to the flow velocity.

An electromagnetic flow meter measures the amount of electromagnetic field change corresponding to the flow velocity by applying the external electric field on the electrically charged gas as depicted in FIG. 1-(e) and converts it to the flow velocity.

As it is depicted in FIG. 1, a differential pressure type, turbine type and area type flow meters out of the traditional flow meters have a disadvantage for additional calibration depending on the kinds of gases to be measured for the flow velocity.

More particularly, a differential pressure flow meter as depicted in FIG. 1-(a), the pressure difference applied to the both ends of the blocking membrane is proportional to the impulse created from the collision of gas molecules in microscopic viewpoint. Here, said impulse is from the momentum change created from the collision of gas molecules with the blocking membrane. In spite of the same change of momentum or impulse, its velocity is differed in case of gas with bigger molecular weight because the momentum is defined as the product of the mass and velocity as it was defined in the Newtonian mechanics. Consequently, in case of using the differential pressure type flow meter, the type of the gas for measuring the flow velocity shall be known in advance, otherwise, the same condition, i.e. the pressure difference applied between the both ends of blocking membranes for the same flow condition of gas shall be calibrated. Such calibration shall be applied to the turbine type or area type flow meter too.

In addition, the differential pressure type, turbine type and area type flow meters have a problem of no measuring the flow velocity change in real time in case of rapid changing of flow velocity to time. For example, in case of pressure difference type flow meter, when the flow velocity is changed rapidly, the pressure difference is created in proportion to such change at the both ends of blocking membranes. However, in responding to said pressure difference, the fluid indicating the pressure difference undulates up and down and such undulating consumes long time to be stabilized. In case of using the fluid with large viscosity for the indicative fluid of pressure difference to solve said problem, the pressure change applied at the both ends of the blocking membrane is not reflected in real time due to its high viscosity.

As describe before, the problems are essentially appeared in the turbine type and area type flow meter too. For example, in case of turbine flow meter, it is considered for the flow velocity change to be reflected in real time when the friction between the rotor and the rotor shaft is small, but it may be measured to have the flow velocity, in spite of no flow velocity as for the case of rotating of pin wheel for a certain time at the instantaneous mouth blow on the pin wheel, thus, when the frictional force between the rotor and the rotor shaft is made bigger to solve such problem, the flow velocity change cannot be measured in real time as is the case of differential pressure type. Said problem may be arisen from the area type flow meter too.

Eventually, the differential pressure type, turbine type and area type flow meters have disadvantage to be used limitedly for the case of very slow change of the flow velocity to the time.

An ultrasonic flow meter is affected by the external noise and it shall be used limitedly to block the external noise of to the place of less noise since the transmitting speed of ultrasonic wave is differed depending on the temperature. It has a disadvantage of calibrating by additional temperature checking in case of flow velocity conversion.

An electronic flow meter has a limitation to measure only the flow velocity of the gas molecules with ionic state and gas with big electric polarity since the gas molecules shall have the electric charge. In addition, it has a disadvantage of additional calibration depending on the type of gas to be measured, more precisely, the electric charge quantity of the gas molecules.

The traditional flow meters have disadvantage of impossibility of measuring the flow velocity by selecting particular gas only in case of mixed flowing of many gases besides the disadvantages as described before.

More particularly, the conventional flow meters is not able to tell from the flow velocity difference of each gas since it measures the average flow velocity of entire gas and considerable error may be made in case of converting the gas flow volume into the economic value due to this reason.

The velocity of gas molecule is inversely proportional to the square root of the gas molecule mass by the ideal gas equation. For example, in case of mixed flowing of the nitrogen and carbon dioxide, the flow velocity of nitrogen is speedier by 25% approximately when the flow velocity of carbon dioxide is 1. But the traditional flow meters measure the average flow velocity of nitrogen and carbon dioxide since they cannot tell from such flow velocity difference. They have problem of calculating more evaluation value in case of measuring the flow volume of carbon dioxide and converting into the economic value due to this reason.

For example, in case of emitting the gas created form the combustion of methane, the traditional flow meters will measure the nitrogen velocity since they measure the average flow velocity of entire gas when it is considered that about 80% of the air is the nitrogen at the measuring on the flow velocity of carbon dioxide. More particularly, the concentration of the carbon dioxide becomes maximum 10% at the perfect combustion since the oxygen concentration in the atmosphere is about 20% when the emission gas is comprised of nitrogen and carbon dioxide. Here, the concentration of nitrogen and carbon dioxide become 8/9 and 1/9 when the maximum emission of carbon dioxide is assumed. When it is measured with the traditional flow meters, it is measured with the gas moving velocity of the effective mass ($m_e$). The effective mass ($m_e$) is defined as the mathematical formula 1.

$$m_e = (\text{The 1}^{st} \text{ gas mass} \times \text{The 1}^{st} \text{ gas composition ratio}) + (\text{The 2}^{nd} \text{ gas mass} \times \text{The 2}^{nd} \text{ gas composition ratio}) \quad \text{Mathematical formula 1}$$

That is, it is same with the emission of the gas with molecular weight of 29.8 approximately since the molecular weight of the nitrogen and carbon dioxide is 28 and 44 respectively in case of emission of composition ratio with 8/9 and 1/9 for nitrogen and carbon dioxide respectively. Eventually, the traditional flow meters will measure the flow velocity of the gas with molecular weight of 29.8. But it corresponds to 0.82 time of the measurement with traditional flow meter since the actual molecular weight of the carbon dioxide is 44. Consequently, since the flow velocity of the carbon dioxide is measured more rapidly about 22% with the traditional flow meters, the emission quantity is calculated by 22% more in case of calculating of carbon dioxide emission with these meters.

When the carbon dioxide emission quantity is converted into the economic value, the emission quantity can be calculated by 22% more with the application of the results measured by traditional flow meters as it was described in detail before. If said emission quantity is simply proportional with the economic value, it has a problem of excessive calculation of cost by 22%.

DETAILED DESCRIPTION OF THE INVENTION

Artistic Task

The objective of present invention to solve said problem is to provide a measuring device for gas flow velocity with improved real time measurement reliability and to measure the particular gas selectively.

In addition, another objective of present invention is to provide a method of measuring the gas flow velocity than enables to improve the real time measuring reliability and to measure the particular gas selectively.

Means of Task Solving

A gas flow velocity meter for one aspect of present invention to accomplish the objective of present invention as set forth before includes; at least a gas detecting section which emits the light with wavelength absorptive to a particular gas for measuring the flow velocity out of the mixed gases including at least one gas, and a control section to calculate the flow velocity of particular gas to be measured based on said detection signal provided from at least one gas detecting section and said gas detecting part that provides the detection signal corresponding to the detected light quantity from such emitted beam. Said gas flow velocity meter may include the gas processing part wherein disturbance is created at the flow of said mixed gas for flow velocity measuring on a particular gas to be measured. Said gas processing part may be configured to spray the indication gas with higher concentration than said particular gas whereas it is same with said particular gas to be measured. Said gas processing part may configure to create the vortex on said mixed gas. At least one of each of said gas detecting section should be installed along the same direction with said mixed gas movement at the distance off from the $1^{st}$ light source wherein a light with absorptive wavelength of said particular gas emits, the $1^{st}$ light detector wherein the light emitted from said the $1^{st}$ light source is detected and the $1^{st}$ detection signal corresponding to the detected light quantity is provided. Said gas detecting section includes; the $2^{nd}$ light source wherein a light with absorptive wavelength of said particular gas emits and the $2^{nd}$ light detector detecting the emitted light from said $2^{nd}$ light source and providing the $2^{nd}$ detecting signal corresponding to detected light quantity, and the $1^{st}$ light path between said the $1^{st}$ light source and the $1^{st}$ light detector and the $2^{nd}$ light path between said the $2^{nd}$ light source and the $2^{nd}$ light detector are parallel. Said the $1^{st}$ and the $2^{nd}$ light path may be configured perpendicularly with said mixed gas flow direction. Said control section enables to calculate the velocity of a particular gas to be measured based on the provided the $1^{st}$ detection signal and the $2^{nd}$ detection signal. At least one of each of said gas detecting section includes; the $1^{st}$ gas detecting section, located at the $1^{st}$ position (L1) from the pre-set basic point, wherein a light with absorptive wavelength of said particular gas emits and providing the detection signal corresponding to the detected light quantity from said emitted light at the $1^{st}$ time (t1), the $2^{nd}$ gas detecting section, located at the $2^{nd}$ position (L2) from the pre-set basic point, wherein a light with absorptive wavelength of said particular gas emits and providing the detection signal corresponding to the detected light quantity from said emitted light at the $2^{nd}$ time (t2), and the $3^{rd}$ gas detecting section, located at the $3^{rd}$ position (L3) from the pre-set basic point, wherein a light with absorptive wavelength of said particular gas emits and providing the detection signal corresponding to the detected light quantity from said emitted light at the $3^{rd}$ time (t3). Said control section is able to calculate the $1^{st}$ velocity (v1), the $2^{nd}$ velocity (v2) and the $3^{rd}$ velocity (v3) based on the detection signal provided from the $1^{st}$, the $2^{nd}$ and the $3^{rd}$ gas detecting section respectively and the terminal velocity of said particular gas based on said calculated the $1^{st}$ velocity (v1), the $2^{nd}$ velocity (v2) and the $3^{rd}$ velocity (v3).

In addition, a gas flow velocity measuring method for another aspect of present invention to accomplish the objective of present invention as set forth before includes; a step wherein a disturbance is created on the mixed gas flow including at least a gas, a step wherein light with absorptive wavelength of a particular gas for the flow velocity to be measured from the mixed gases flowing in disturbance is emitted and the detection signal corresponding to the detected light quantity from said emitted light is provided and a step wherein a flow velocity of a particular gas based on the provided detection signal is calculated. A step, wherein a disturbance is created at the flow of mixed gas including at least a gas enables to spray the indication gas with higher concentration than said particular gas for measuring the flow velocity of a particular gas to be measured while it is same with said particular gas. A step, wherein a disturbance is created on the flow of mixed gas including at least a gas enables to create a vortex on said mixed gas. A step wherein a light with absorptive wavelength for a particular gas to be measured for the flow velocity from the mixed gases is emitted and corresponding detection signal is provided to the detected light quantity from said emitted light includes; a step wherein a light with absorptive wavelength for said particular gas from the $1^{st}$ light is emitted, a step wherein the $1^{st}$ light source is detected and the $1^{st}$ detection signal corresponding to the detected light quantity is provided, a step wherein a light with absorptive wavelength for said particular gas from the $2^{nd}$ light is emitted, and a step wherein the $2^{nd}$ light source is detected and the $2^{nd}$ detection signal corresponding to the detected light quantity is provided. A step wherein the flow velocity of a particular gas to be measured based on the said provided detection signal is calculated enables to calculate flow velocity of a particular gas to be measured based on said the $1^{st}$ and the $2^{nd}$ detection signal. A step, wherein a disturbance is created on the flow of mixed gas including at least a gas enables to create a vortex on said mixed gas. A step wherein a light with absorptive wavelength for a particular gas to be measured for the flow velocity from the mixed gases is emitted and corresponding detection signal is provided to the detected light quantity from said emitted light includes; a step wherein a light with absorptive wavelength of a particular gas is emitted at the point off from the disturbed point by the $1^{st}$ distance (L1) and the $1^{st}$ time (t1), and detection signal corresponding to the detected light quantity from said emitted light is provided, a step wherein a light with absorptive wavelength of a particular gas is emitted at the point off from said disturbed point by the $2^{nd}$ distance (L2) and the $2^{nd}$ time (t2), and detection signal corresponding to the detected light quantity from said emitted light is provided, and a step wherein a light with absorptive wavelength of a particular gas is emitted at the point off from said disturbed point by the $3^{rd}$ distance (L3) and the $3^{rd}$ time (t3), and detection signal corresponding to the detected light quantity from said emitted light is provided. A step, wherein the flow velocity to be measured based on said detection signal is calculated, enables to measure a terminal velocity of a particular gas based on a step wherein the $1^{st}$ velocity (v1), the $2^{nd}$ velocity (v2) and the $3^{rd}$ velocity (v3) is calculated based on the detection signals provided at said the $1^{st}$ time (t1), the $2^{nd}$ time (t2) and the $3^{rd}$ time (t3), and based on said the $1^{st}$ velocity (v1), the $2^{nd}$ velocity (v2) and the $3^{rd}$ velocity (v3) and the $1^{st}$ distance (L1), the $2^{nd}$ distance (L2) and the $3^{rd}$ distance (L3).

Effect of invention

As set forth before, according to the gas flow velocity meter and gas flow velocity measuring method, the prior calibration for measuring the gas is not required and exact measurement of the flow velocity in the rapid change of flow velocity is available in real time. In addition, a selective measurement on a particular gas is available in case of mixed flowing of various gases and the emission quantity of a particular gas is calculated precisely based on this. In addition, the reliability can be improved in case of converting the emission quantity of a particular gas into the economic value.

SIMPLE EXPLANATION ON THE DRAWING

FIG. 10 is a flow chart to describe how to measure the gas flow velocity according to an embodiment of present invention.

EXPLANATION ON THE SIGNS OF KEY POINTS ON THE DRAWING

Figure 1:
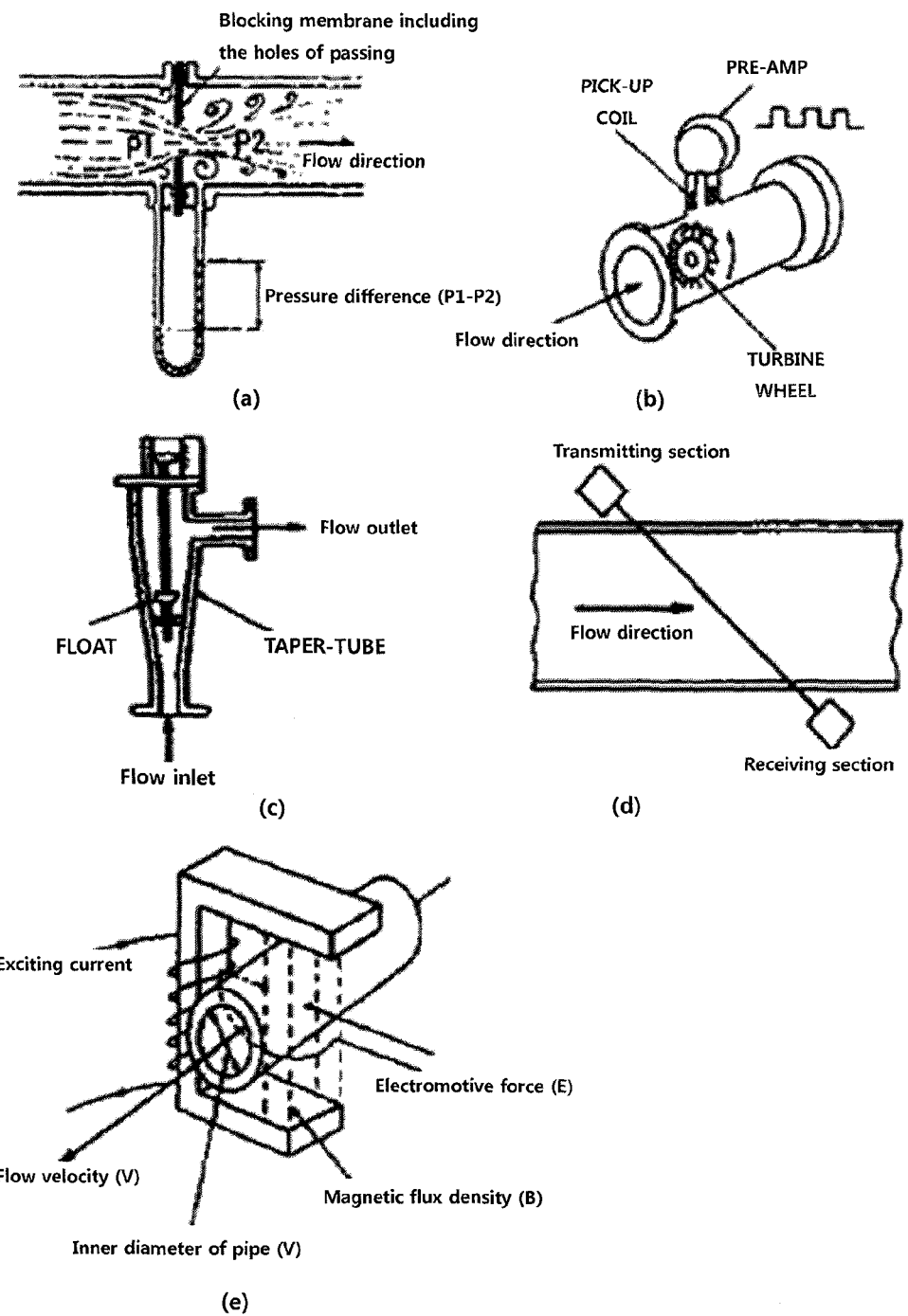
FIG. 1 is an illustrative drawing for showing the type and operation method of the general flow meter.

110: Gas processing part
130a, 130b, 139c; Gas detecting section
150: Control section 160: Display section
170: Communication interface part 180: Gas guide part
190: Fixing part

THE BEST TYPE FOR THE EMBODIMENT OF THE INVENTION

The embodiments according to the concept of the invention may be changed to diverse forms, so that the invention will be described and illustrated with reference to specific embodiments.

However, it should be understood that the embodiments according to the concept of the invention in not intended to limit to the specific embodiments disclosed, but they include all the modifications, equivalences and substitutions, which are included in the scope and sprit of the invention.

It will be understood that although the terms "first" and/or "second," etc. may be used herein to describe various elements, these elements should not be limited by these terms. These terms are only used to distinguish one element from another element. Thus, a first element discussed below could be termed a second element and vice versa without departing from the right scope of the present invention. Similarly, a second element could be terms as a first element. The term, and/or includes either of the combination of the items described for the plurals or any item described for the plurals.

It will be understood that when an element is referred to as being "connected or coupled" to another element, it can be directly connected or coupled to the other element or intervening elements may be present there between. In contrast, when an element is referred to as being "directly connected or coupled" to another element, there are not intervening elements present.

The terminology used herein is for the purpose of describing particular embodiments only and it not intended to limit the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, integers, steps, operations, elements and/or components, but do not preclude the presence or addition of one or more other features, integers, steps, operations, elements, components and/or groups thereof.

Unless otherwise defined, the meaning of all terms including technical and scientific terms used herein is the same as that commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure and will not be interpreted in an idealized or overly formal sense unless expressly so defined herein.

The invention will now be described with reference to the accompanying drawings, in which exemplary embodiments of the invention are shown. The same reference numerals indicated in the drawings refer to same elements throughout and the overlapped explanation for same elements will be cancelled for easy entire understanding on the explanation on present invention.

Hereinafter, a theoretical analysis method adapted to a gas flow velocity meter and a gas flow velocity measuring method according to the embodiment of present invention are described for understanding on the art and operation principle for a gas flow velocity meter and a gas flow velocity measuring method according to an embodiment of present invention.

1. A Diffusion Velocity Depending on the Gas Type

An equation of mathematical formula 2 is established for kinetic energy of gas molecules since it is proportional to the absolute temperature T in case of free space.

$$E = 1/2 mv^2 = 3/2 kT \qquad \text{Mathematical formula 2}$$

In the mathematical formula 2, m is the mass of the gas molecules, k is the Boltzmann constant and T is absolute temperature. As it is known from mathematical formula 2, the velocity of gas molecules is proportional to the square root of the mass of gas molecule when the temperature is T. Consequently, the bigger molecular weight of gas is, the velocity is smaller, on the contrary, the smaller molecular weight of gas is, the velocity is bigger.

Figure 2:
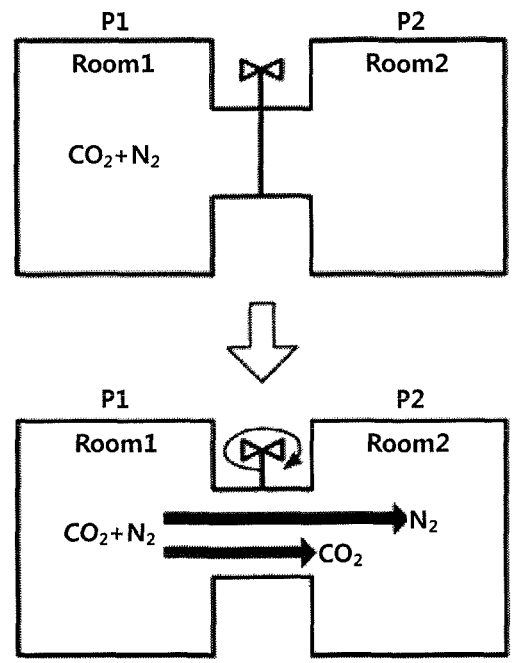
FIG. 2 is an illustrative drawing to describe the gas flow velocity depending on the molecular weight of the gas molecules.

FIG. 2 is an illustrative diagram to explain the gas flow velocity depending on the molecular weight of gas.

The gas flow velocity depending on the molecular weight is explained with reference to FIG. 2. The channel is installed in between two closed rooms (Room 1 and Room 2) with same volume and assume the pressure of each room as P1 and P2 respectively (Here, P1>P2) at the closed state of said channel with blocking valve. When the blocking valve in the middle is opened at the mixed state of carbon dioxide and nitrogen, carbon dioxide and nitrogen diffuses and moves to the other room (Room 2) due to the pressure difference. Here, assume that the room with pressure of P2 (Room 2) is filled with another type of gas.

When the blocking valve is opened as described before, the nitrogen with less molecular weight diffuses speedier. When the relation between the molecular weight and moving velocity is expressed with the mathematical formula 2, it is shown with mathematical formula 3.

$$v \propto \frac{1}{\sqrt{m}} \qquad \text{Mathematical formula 3}$$

The moving velocity of nitrogen is faster by 1.26 times than that of carbon dioxide since the molecular weight of carbon dioxide in mathematical formula is 44 and that of nitrogen is 28. If the flow velocity of carbon dioxide is measured with traditional flow meters in this situation, it may be measured higher by 26% in maximum.

For example, in case of emitting the gas created from the combustion of methane (CH4), the gases created from the perfect combustion are carbon dioxide and steam vapor as it is shown in reaction formula 1.

$$CH_4 + 2O_2 \rightarrow CO_2 + 2H_2O \qquad \text{(Reaction formula 1)}$$

Otherwise, in case of combusting the methane with external air, the emission gas includes the non-combusted nitrogen besides the carbon dioxide and steam vapor expressed in the reaction formula 1. (Here, the gases of nitrogen oxides (NOx) series created from the nitrogen combustion out of discussion.) Eventually, the average velocity of nitrogen, oxygen, steam vapor and carbon dioxide is measured when the carbon dioxide flow velocity is measure with traditional flow meter in case of emitting the combusted methane through chimney and the velocity of carbon dioxide can be measured excessively by maximum 26% as it was described.

2. Optical Characteristics of Gas Molecule

In the gas flow velocity meter and gas flow velocity measuring method according to an embodiment of present invention, the gas flow velocity of a particular gas is selectively measured by measuring the moving velocity of a particular gas after making easy for distinction of said particular gas and flow velocity measuring by applying the physical stimulus reactive with said particular gas or inserting an indicator in order to measure the flow velocity of a particular gas out of the mixed gases.

Hereinafter, the theoretical background to measure a particular gas selectively in the gas flow velocity meter and gas flow velocity measuring method according to an embodiment of present invention.

1) Light Absorption Spectrum of a Gas

A gas flow velocity meter and a gas flow velocity measuring method according to an embodiment of present invention use the light absorptive characteristics of gas molecules for basic principle to measure the flow velocity of a particular gas selectively.

Figure 3:
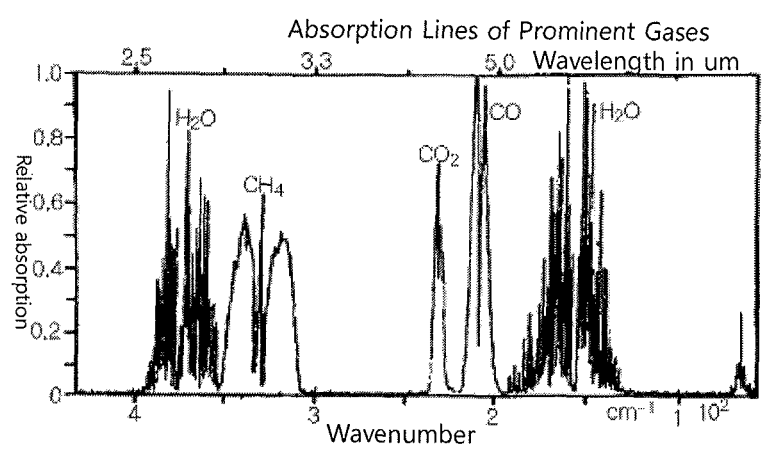
FIG. 3 shows the light absorption spectrum of gas molecule.

FIG. 3 shows the light absorption section of gas molecules.

The gas molecules are bonded with more than 2 atoms in general and they have the vibration energy corresponding to the binding energy state of two atoms. Such vibration energy transits to the higher energy level by absorbing the light with wavelength (or frequency) resonating to the vibration energy which is unique for the binding state, or transits to the lower energy state by emitting the light. Such transition has a property of absorbing the light with unique wavelength (or frequency) since the energy state is quantized.

For example, carbon dioxide has very excellent absorptive characteristics for the light with the wavelength of 4.26 μm as it is depicted in FIG. 3. Methane, carbon monoxide and ammonia have stronger absorptive characteristics for the wavelength of 3.4 μm, 4.64 μm and 10.5 μm respectively than other wavelength. Such light absorption property based on the unique physical property of gas molecule.

The moving velocity (Namely, flow velocity) is measured only for a particular gas out of the mixed gases with use of the light absorption property of gas molecules in a gas flow velocity meter and a gas flow velocity measuring method according to an embodiment of present invention. For example, the light with wavelength of 4.26 μm is used to measure the flow velocity of carbon dioxide. In analogical explanation, it is same with measuring the moving velocity of carbon dioxide only by using a special pair of glasses which can see the movement of carbon dioxide only. In addition, it creates the physical disturbance on the gas flow to be measured and measures the moving gas flow velocity at the state of maintaining said disturbance.

2) Beer-Lambert Theory

Beer-Lambert Theory defines the relation between the gas concentration and transmitted light quantity in case of absorbing the light of unique wavelength by gas molecules. The path of arriving of the emitted light from the light source at the light detector is called as an optical path. The gas molecules located on the optical path absorb a part of an emitted light from the light source and transmits the other part.

On the basis of gas concentration of 0, the bigger concentration of a gas is, the less light quantity arriving at the light detector is. In the other words, the gas concentration and light quantity detected in the light detector are inversely proportional. Such relation is derived as follows. Let the light quantity arriving at the light detector as $I_o$ and the remained light quantity after partial absorbing with respect to an arbitrary gas concentration X as I when the gas molecule concentration is 0. If there is a change in the gas concentration by infinitesimal change of dX, the relation with the infinitesimal change of light quantity dI is expressed with the differential equation of mathematical formula 4.

$$dI = -\alpha I dX \qquad \text{Mathematical formula 4}$$

The ∝ in the mathematical formula 4 does not have relation with the light quantity because it is a value showing the light absorption rate of gas molecules and it is defined as light absorption rate with respect to the unit concentration. In addition, – sign is shown because the light quantity change is inversely proportional to the concentration in the mathematical formula 4 and the change of light quantity is proportional to the entire light quantity. Accordingly, the mathematical formula 5 is derived when the solution of mathematical formula 4 is obtained.

$$I = I_0 e^{-\alpha X} \qquad \text{Mathematical formula 5}$$

For example, as described in detail before, in case of moving of mixed gases inside the chimney, apply the physical stimulus disturbing the distribution of carbon dioxide and measure the light quantity change by projecting the light with wavelength of 4.26 μm which is absorbed by physically disturbed carbon dioxide during movement, and then, the detected light quantity by the light detector is appeared as disturbed shape by the concentration disturbance. When said process is measured at 2 spots along the gas flowing direction, the moving velocity of disturbed carbon dioxide is obtained.

As set forth before, the disturbed gas velocity becomes the velocity of carbon dioxide eventually since the light with wavelength of 4.26 μm is absorbed by carbon dioxide only. The moving velocity of methane can be measured when the light source emits the light with wavelength of 3.4 μm by using said method and the moving velocity of ammonia or ethylene can be measured when the light with wavelength of 10.5 μm is emitted.

The light source does not have to emit the light with absorptive wavelength by corresponding gas in the selection of light source to measure a particular source. For example, the case of attaching the light filter transmitting the light only for a particular wavelength on the light detector to measure a particular gas is physically same with using the light source emitting the corresponding wavelength since the light detector will measure the light quantity of the corresponding wavelength only. Accordingly, the type or structure is not limited as far as the equipment provides the light source to project the light with wavelength of absorbing a particular gas to be measured in a gas flow velocity measuring method according to an embodiment of present invention.

3. Velocity

1) Definition on the Velocity

A velocity is a physical quantity which is defined with the displacement divided with time by measuring the displacement of a moving object from an arbitrary point to another point and consuming time. In general, the speed is defined as the value of dividing the moving distance with the consumed time, but in case of one dimensional motion, both physical quantities have same concept. One dimensional motion is taken as an example for explanation in present invention. Accordingly, the velocity and speed can be regarded as same in the embodiment of present invention, but the velocity is used for representative term in the embodiment of present invention.

The definition of velocity (v) and acceleration (a) is same with mathematical formula 6 and 7 respectively.

$$v = \frac{dL}{dt} \qquad \text{Mathematical formula 6}$$

$$a = \frac{dv}{dt} \qquad \text{Mathematical formula 7}$$

In the mathematical formula 6 and 7, v is the velocity, L is the displacement (Distance), t is the time and a is the acceleration.

2) Terminal Velocity

When a particle moves by external force, the moving velocity of a particle increases consistently if the external force maintains consistently. In addition, there is a case of creating the resistive force in proportion to the velocity and such resistive force becomes bigger as the velocity increases and the external force and resistive force are in equilibrium and a particle is set into the constant velocity motion. This velocity is called as a terminal velocity. For example, raindrops made from the cloud seem to be looked as they fall as freely by the gravity, but they move with constant velocity from the moment of equilibrium between the gravity and atmospheric resistive force as the atmospheric force becomes larger as the velocity of raindrops increase.

When the described theory is applied to the emission of gas from the chimney, gas molecules emit by moving from the lower point to the higher point of chimney due to the pressure difference between the lower point and higher point of chimney. The velocity of gas molecules will be increased by the pressure in the motion of gas molecules, but the gas molecules emit by moving in constant velocity eventually since the surrounded air resistive force exerts against the velocity increase of the gas molecules. An equation for such motion can be summarized as mathematical formula 8. In the other words, the force exerting on one molecule of gas is the resistive force proportional to the constant pressure and the increase of molecular speed and both forces are opposite in their direction. Therefore, the equation for the motion of force exerting on the gas molecules is summarized as mathematical formula 8.

$$m\frac{dv}{dt} = p - \beta v \qquad \text{Mathematical formula 8}$$

In the mathematical formula 8, me is the mass of the gas molecule, v is the velocity of gas molecule, p is the average force exerting on one gas molecule by the pressure and β is a kind of resistance coefficient which is inversely proportional to the mean free path length during collision with other molecules and it has − sign since it is applied to the opposite direction of the moving direction with the value proportional to the consuming time for the moving distance.

In addition, the solution obtained from the differential equation expressed in mathematical formula 8 is expressed as mathematical formula 9.

$$v(t) = v_f - (v_f - v_0)e^{-\frac{t}{\tau}} \qquad \text{Mathematical formula 9}$$
$$v_f = \frac{p}{\beta}$$
$$\tau = \frac{m}{\beta}$$

$v_o$ means the initial velocity and $v_f$ means the terminal velocity in the mathematical formula 9. If the m9 is expressed in graph, it is shown as FIG. 4.

Figure 4:
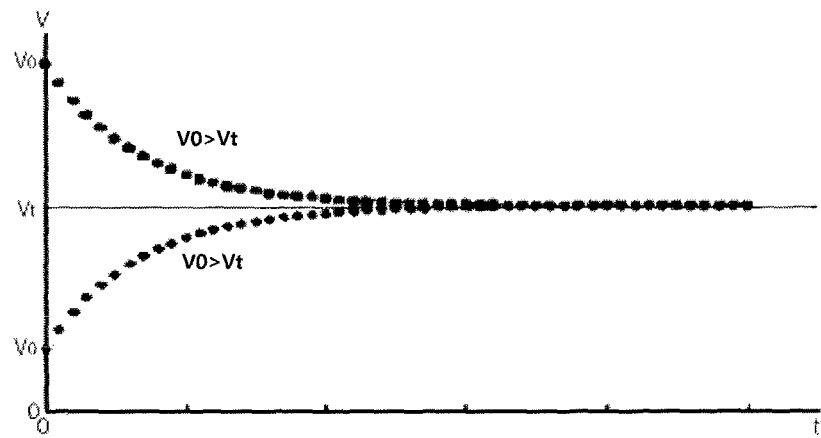
FIG. 4 is a graph depicting the change of velocity by the acceleration motion and resistance.

FIG. 4 is a graph which shows the acceleration motion and velocity change by the resistive force.

With reference to FIG. 4, in case of existence of external force proportional to the velocity, when the initial velocity is $v_o$, the external force (For example, the pressure in case of gas emission) and resistive force exert and it means that it reaches to finally $v_f$, the terminal velocity. If it is applied to the gas emission system, it means that the initial gas is emitted through chimney with constant velocity (Namely, terminal velocity) after elapsing of a certain time regardless of emitting gas naturally by combustion ($v_o<v_f$) or strongly emitting.

The analysis in the above is not limited to the initial point to the terminal point of the chimney. For example, in case of hindrance on the gas flow due to the obstacle in the middle of chimney, in the other words, in spite of the change on the gas velocity, it can be said that it is converged to the terminal velocity again after elapsing of a certain time.

The consideration on the terminal velocity in an embodiment of present invention, has a meaning to calculate the terminal velocity which is the gas emission velocity by obtaining the terminal velocity from mathematical formula 9 through measuring the velocity change in each section even though changes on the gas flow velocity partially in case of physical disturbing in the flow velocity of gas by the method suggested in present invention.

4. Selective Method for Measuring the Gas Flow Velocity by Using the Light Absorption of the Gas Molecules 1) Creation and Moving of Physical Disturbance In case of mixed flowing of various gases, the strength of disturbance becomes smaller depending on the moving distance when a disturbance is created on the gas flow, but the disturbance moves a certain distance along the gas flow. In a gas flow velocity meter and gas flow velocity meter according to embodiment of present invention, it is made to sense a particular gas only out of the mixed gases by using disturbance as described before and the flow velocity of a particular gas is measured by measuring the moving velocity of disturbance.

Examples of spraying method of highly concentrated indicating gas to a particular gas to be measured with said disturbing and a method of vortex creation from the gas flow using chopper are taken for explanation in the embodiment of present invention. But, said disturbing method is merely a part of embodiment for the artistic sprit of present invention and it is evident to the provider that diversified methods can be applied besides the described methods.

Figure 5:
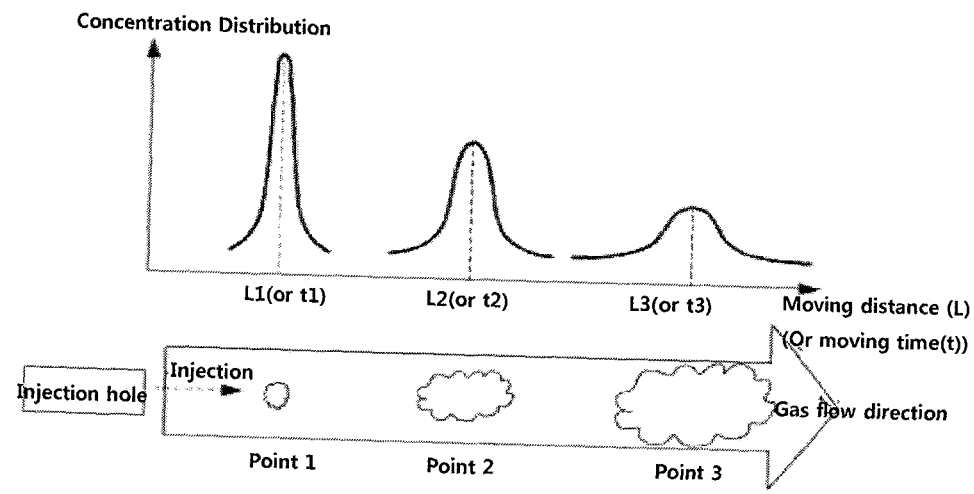
FIG. 5 is an illustrative diagram to describe how to create the disturbance on the gas to be measured in the gas flow velocity measuring method according to an embodiment of present invention.

FIG. 5 is an illustrative diagram showing the method of creating disturbance on the gas to be measured in the gas flow velocity measuring method according to an embodiment of present invention. In FIG. 5, an example of disturbing the concentration by spraying the same indicating gas in high concentration with a particular gas to be measured was taken by illustration.

With reference to FIG. 5, the indicating gas sprayed from the spraying hole creates localized high concentration and moves to the gas flowing direction. Here, the type of indicating gas is same with the gas to be measured and said indicating gas has higher concentration than the concentration of a particular gas to be measured. In case that the sprayed high concentration gas moves to the second point (L2) after passing the first point (L1), even though the localized concentration of indicating gas becomes smaller and range is widened by diffusing, nevertheless, the moving velocity of the center of the concentration distribution becomes the moving velocity of indicating gas.

Accordingly, the moving velocity of indicating gas can be measured by measuring the distance between the first point (L1) and the second point (L2) and the time for the movement of indicating gas from the first point (L1) and the second point (L2). By the same way, it is possible to measure the moving velocity of indicating gas from the second point (L2) to the third point (L3). It is possible to measure the moving velocity in each section until the disappearing of the concentration distribution by the diffusion of indicating gas.

The moving velocity of a particular gas to be measured out of mixed gases can be obtained eventually when the moving velocity of indicating gas is measure since the indicating is same with the gas to be measured.

Figure 6:
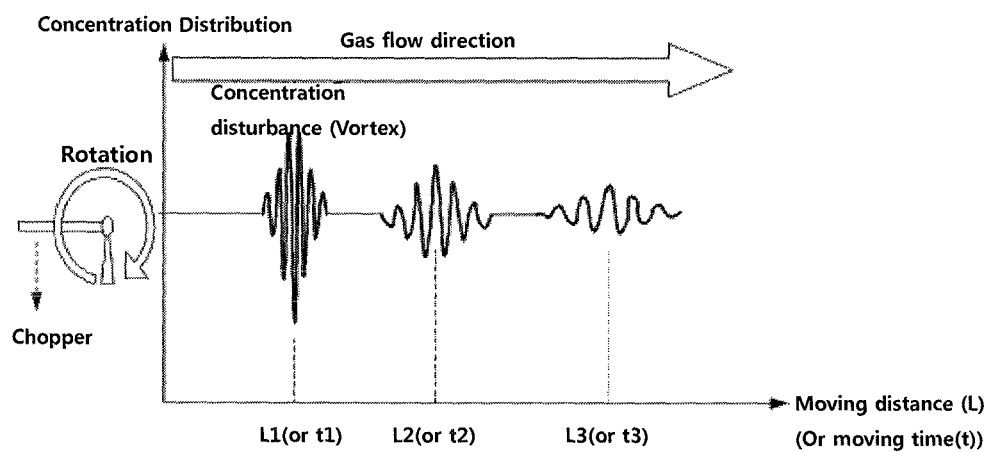
FIG. 6 is an illustrative diagram to describe how to create the disturbance on the gas to be measured in the gas flow velocity measuring method according to another embodiment of present invention.

FIG. 6 is an illustrative diagram showing the method of creating disturbance on the gas to be measured in the gas flow velocity measuring method according to an embodiment of present invention. In FIG. 6, an example of disturbing the concentration of flowing gas by creating vortex on the gas flowing into a certain structure with chopper was taken by illustration.

With reference to FIG. 6, the vortex created by chopper disturbs the concentration of flowing gas and moves to the gas flow direction while it is maintained for a certain time. Accordingly, the moving velocity of a particular gas can be measured by measuring the moving velocity of vortex created by chopper, i.e. disturbing velocity of concentration as same with the case of indicating gas explained in detail (Refer to FIG. 5).

2) A Method of Measuring the Gas Flow Velocity Using Physical Disturbance

Figure 7:
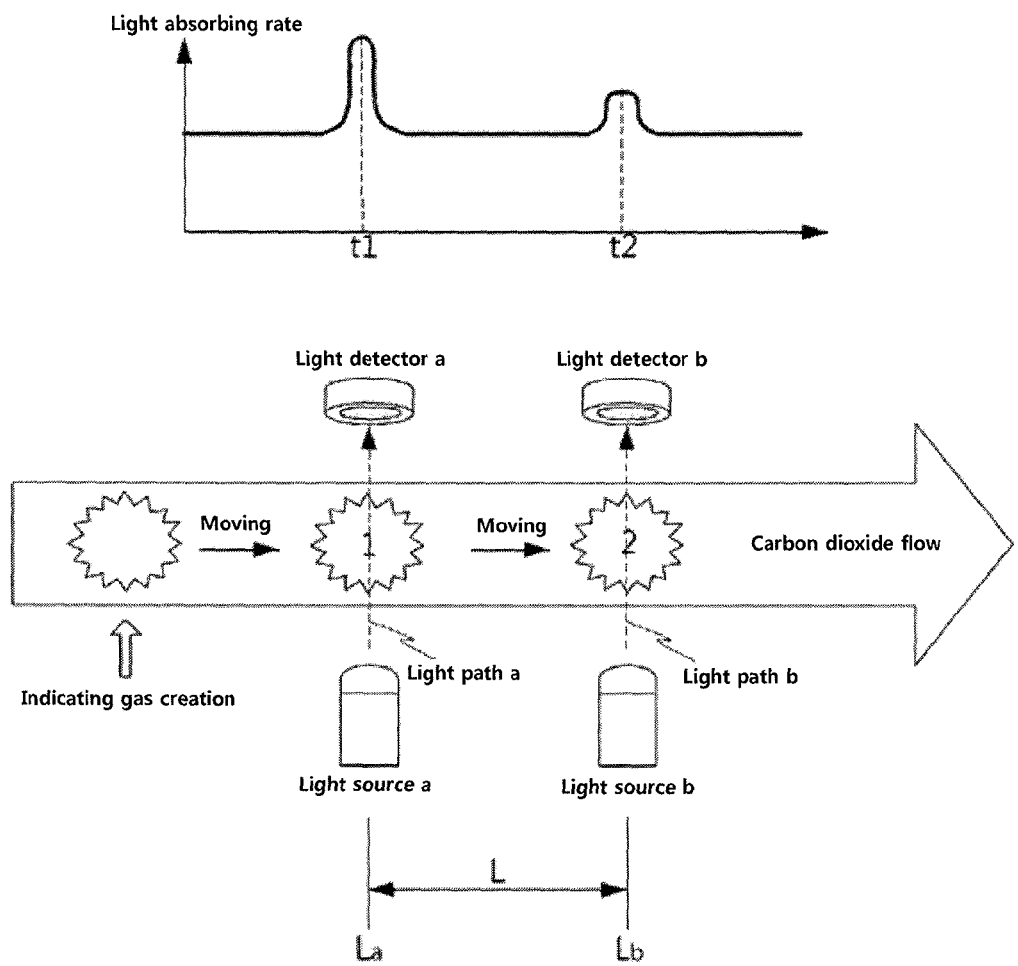
FIG. 7 is an illustrative diagram to describe how to measure the disturbed gas flow velocity in the gas flow velocity measuring method according to an embodiment of present invention.

FIG. 7 is an illustrative diagram showing the method of measuring the moving velocity of the disturbed gas after creation of disturbance on the flowing gas in the gas flow velocity measuring method according to an embodiment of present invention. In FIG. 7, an example of measuring the flowing velocity of carbon dioxide out of mixed gases was depicted and the use of high concentration indicating gas by means of physical disturbance in the measuring process is depicted as an example.

With reference to FIG. 7, light source$_a$, light detector$_a$, light source$_b$ and light detector$_b$ are used to measure the moving velocity of disturbed gas. Here, the light emitted from the light source$_a$, reaches to the light detector$_a$ and does not reach to light detector$_b$. By the same way, the light emitted from the light source$_b$ reaches to the light detector$_b$ and does not reach to light detector$_a$. In addition, light path$_a$ between the light source$_a$ and light detector$_a$, light path$_b$ between the light source$_b$ and light detector$_b$ are parallel each other.

The light source$_a$ and light source$_b$ in FIG. 7 can be configured to emit the light with wavelength absorbing by a particular gas to be measured, or configured to detect only the light with wavelength absorbing by said particular gas by using the described light filter.

For example, in case of mixed flowing of various gases, said light source$_a$, and light source$_b$ are configured to emit the light with wavelength of 4.26 µm and the light detector$_a$, and light detector$_b$ are configured to detect the light with wavelength of 4.26 µm. A part of the light with wavelength of 4.26 µm emitted from light source$_a$, and light source$_b$ is absorbed by the carbon dioxide in the course of reaching to the light detector$_a$, and light detector$_b$ and the remained light reach to the light detector$_a$, and light detector$_b$. The light quantity detected with the light detector$_a$, and light detector$_b$ is differed by the concentration of carbon dioxide and it is explained in Beer-Lambert theory as set forth before. In the other words, the light quantity reached to the light detector$_a$, and light detector$_b$ will be big when the concentration of carbon dioxide is low and it will be small when the concentration of carbon dioxide is high.

As it is depicted in FIG. 7, the distribution of concentration created by the indicating gas is detected in the light detector$_a$, and light detector$_b$ respectively in pulse type of each concentration at the $1^{st}$ point ($L_a$) and the $2^{nd}$ point ($L_b$). Accordingly, the moving velocity of carbon dioxide will be measured by measuring the pulse moving time corresponding to the concentration of indicating gas and off-distance between the light detector$_a$, and light detector$_b$.

Figure 8:
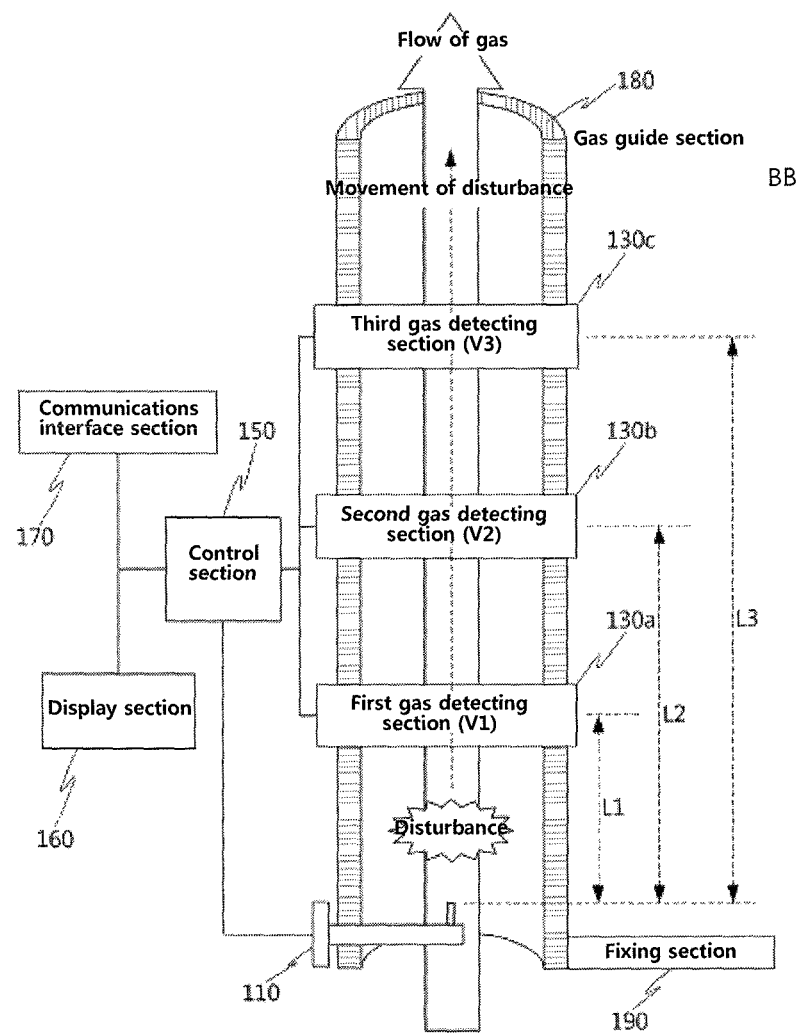
FIG. 8 is the configuration of the gas flow velocity measuring method according to an embodiment of present invention.

FIG. 8 shows the configuration of gas flow velocity meter according to an embodiment of present invention.

Figure 9:
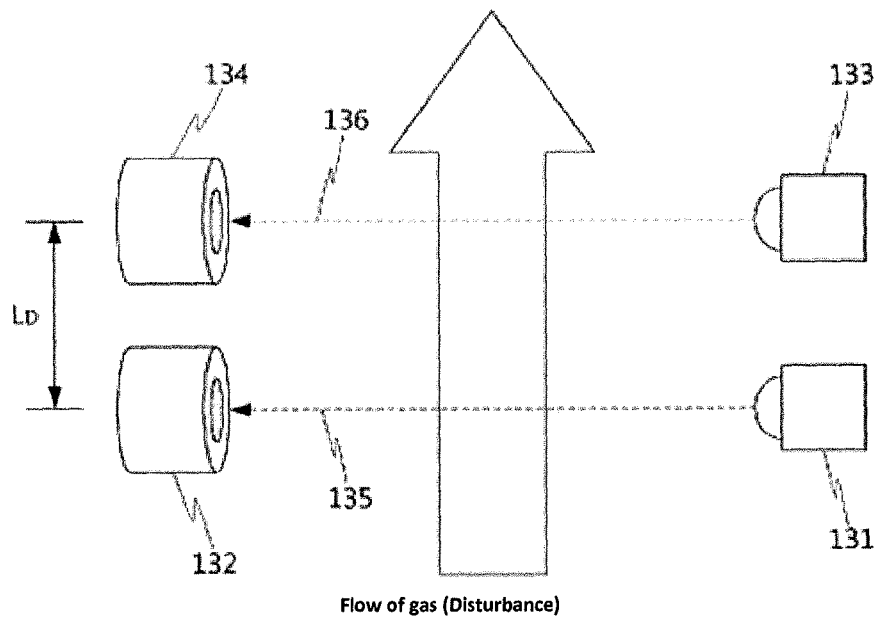
FIG. 9 is an illustrative drawing for details of configuration and operation principle of the gas detecting section depicted in FIG. 8.
Figure 9:
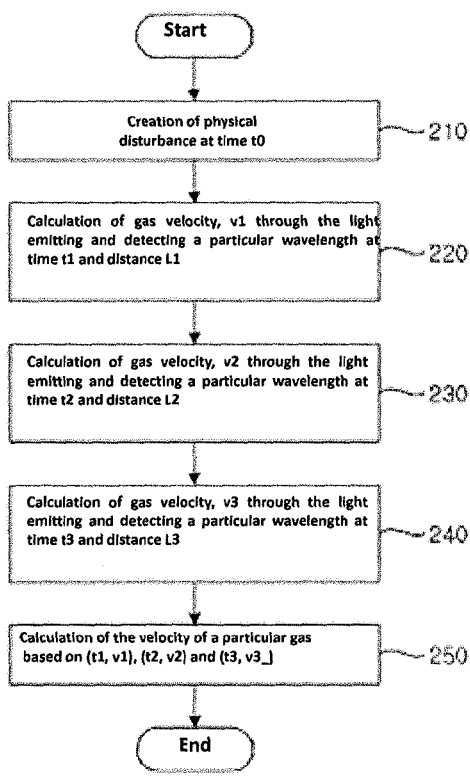

In addition, FIG. 9 is an illustrative diagram for the details of configuration and operating principle on the gas detecting part depicted in FIG. 8.

With reference to FIG. 8, a gas flow velocity measuring method according to an embodiment of present invention may include the gas processing part (110), gas detecting section (130a, 130b and 130c), control section (150) and display section (160) and telecommunication interface part (170) and further include the gas guide section (180) and fixing part (190) depending on manufacturing type.

More particularly, a gas processing part is made to detect a particular gas to be measured based on the disturbance created by gas detecting part (130a, 130b and 130c) by creating the physical disturbance on the flowing gas based on the control by the control section (150). Here, said disturbance may be created by the insertion of indicating gas or vortex for example.

A gas processing part can be configured in various types. For example, gas processing part (110) can be configured with the gas spraying part which sprays highly concentrated indicating gas (Here, said gas is the same gas to be measured.) as it is depicted in FIG. 5 and may be configured with the chopper which creates vortex on the flowing gas as depicted in FIG. 6.

A gas detecting section (130a, 130b and 130c) may be configured with at least one unit and each gas detecting section (130a, 130b and 130c) may include at least one light source emitting the light with wavelength of absorptive to a particular gas to be measured and at least one light detector which detects the corresponding light quantity emitted from at least one light source emitting the light with absorptive wavelength for a particular gas to be measured.

A gas flow velocity meter according to an embodiment of present invention depicted in FIG. 8 is illustrated by taking an example of configuration of 3 units of gas detecting part (Namely, 130a, 130b and 130c), but with regards to the quantity of gas detecting part may be configured with more or less quantity depending on the various measuring environments not limited to 3 units.

The reason of illustrating with 3 units of gas detecting sections (130a, 130b and 130c) is to derive 3 equations with respect to 3 parameters in mathematical formula 9 by measuring such velocity respectively and to obtain terminal velocity by obtaining the solution of equations because the initial velocity of disturbance is not same with the gas flow velocity and velocity change is made while the disturbance moves and reaches to the terminal velocity inside the gas guiding part (180) in case of disturbance creation by the gas processing part (110).

However, more velocity data may be needed to obtain more accurate terminal velocity in case of interfering on the instantaneous velocity of the gas to be measured by other factor based on the detected signal from each gas detecting section (130a, 130b and 130c) and more gas detecting sections may be installed in this case. Otherwise, simply one gas detecting section may be installed at the state of maintaining the created disturbance sufficiently in case of closing to the terminal velocity within a certain error range.

Each gas detecting section (130a, 130b and 130c) emits the light with a particular wavelength based on the control from the control section (150) and provides the corresponding electric signal (For example, voltage or current signal) to the detected light quantity in response to the emitted light.

If more details of configuration and operation principle of gas detecting part are explained by referring to FIG. 9, each gas detecting part may be configured with the $1^{st}$ light source (131), the $1^{st}$ light detector (132), the $2^{nd}$ light source (133) and the $2^{nd}$ light detector (134). Here, the light emitted from the $1^{st}$ light source (131) reaches to the first light detector (132) only and does not reach to the $2^{nd}$ light detector. In addition, the light emitted from the $2^{nd}$ light source (133) reaches to the $2^{nd}$ light detector (134) only and does not reach to the $1^{st}$ light detector.

The direction of the $1^{st}$ light path between the first light source and the $1^{st}$ light detector and the direction of the $2^{nd}$ light path between the $2^{nd}$ light source and the $2^{nd}$ light detector is made to be perpendicular by allocating the $1^{st}$ light source (131), The $1^{st}$ light detector (132), the $2^{nd}$ light source (133) and the $2^{nd}$ light detector (134). The $1^{st}$ light source (131) and the $2^{nd}$ light source (133) emit only the light with the wavelength absorbed by a particular gas to be measured for gas flow velocity or the light absorbed by said particular gas and the $1^{st}$ light detector (132) and the $2^{nd}$ light detector (134) detect only the light with the wavelength absorbed by a particular gas to be measured for gas flow velocity or the light absorbed by said particular gas. If the $1^{st}$ light source (131) and the $2^{nd}$ light source (133) emit only the light with the wavelength absorbed by a particular gas to be measured for gas flow velocity, the $1^{st}$ light detector (132) and the $2^{nd}$ light detector (134) detect only the light with the wavelength absorbed by said particular gas to be measured for gas flow velocity. If the $1^{st}$ light source (131) and the $2^{nd}$ light source (133) emit only the light with the wavelength absorbed by a particular gas to be measured for gas flow velocity, the detection of light with different wavelength including the wavelength absorbed by said gas by the 1$^{st}$ light detector (132) and the 2$^{nd}$ light detector (134) does not matter.

The light emitted from the 1$^{st}$ light source (131) forms the 1$^{st}$ light path (135) in the course of reaching to the 1$^{st}$ light detector (135) and the light emitted from the 2$^{nd}$ light source (133) forms the 2$^{nd}$ light path (136) in the course of reaching to the 2$^{nd}$ light detector (134). The 1$^{st}$ light detector (135) and the 2$^{nd}$ light detector (134) are off to the gas flow direction by a certain distance ($L_D$). The 1$^{st}$ light path (135) and the 2$^{nd}$ light path (136) are parallel and perpendicular to the direction of gas flow. At this time, $L_D$ is sufficiently small compared to the distance to each gas detecting section, L1, L2 and L3.

The disturbance in the gas flow passes the 2$^{nd}$ light path (136) after the 1$^{st}$ light path (135). If the consumed time is tp at the time, the velocity of the disturbance passing through the gas detecting section, v can be calculated by the mathematical formula 10.

$$v = \frac{L_D}{t_D}$$ Mathematical formula 10

Here, v means the moving velocity of the disturbance measured through the gas detecting section. v can be regarded as an instantaneous velocity passing of the disturbance to the gas detecting section when $L_D$ is made sufficiently smaller than L1, L2 and L3 which are the distances from the points of disturbance creation depicted in FIG. 8 to each gas detecting section since the disturbance moves with acceleration from the creation till reaching to the terminal velocity as it was described in detail.

The control section (150) control the motion of gas processing part (110), gas detecting section (130a, 130b and 130c), display section (160) and communication interface section (170).

Especially, the control section (150) calculates the flow velocity of a particular gas to be measured in response to the electric signal provided from the gas detecting section (130a, 130b and 130c) and provides the calculated flow velocity to the display section (160) or transmit the calculated flow velocity to the pre-determined equipment via communication interface section (170).

More particularly, the method of obtaining the terminal velocity of a particular gas for the control section (150) based on the electric signal (Namely, voltage or current corresponding to the detected light quantity) provided from the gas detecting section (130a, 130b and 130c) is as follows.

Firstly, put the point of disturbance creation by the gas processing part (110) as t=0, the 1$^{st}$ gas detecting section (130a) detects the emitted light with wavelength absorptive to a particular gas when the created disturbance is reached to the 1$^{st}$ gas detecting section (130a) located at the distance L1 from the gas processing part (110) and provides corresponding the 1$^{st}$ electric signal to the control section (150).

The control section (150) calculates the moving velocity of disturbance, v1 based on the 1$^{st}$ electric signal provided from the 1$^{st}$ gas detecting section (130a) and put the time at this moment, t=t1.

Later, the disturbance reaches to the 2$^{nd}$ gas detecting section (130b) and the 3$^{rd}$ gas detecting section (130c) which are located at the point off by L2 and L3 from the gas processing part (110). The 2$^{nd}$ gas detecting section (130b) and the 3$^{rd}$ gas detecting section (130c) detect the light with the same method of the 1$^{st}$ gas detecting section (130a) and provide corresponding to the 2$^{nd}$ and 3$^{rd}$ electric signal to the control section (150).

The control section (150) measures the moving velocity of disturbance based on said the 2$^{nd}$ and 3$^{rd}$ electric signal and the times at this moment are t=t2 and t=t3.

Here, the initial velocity of the disturbance created from the gas processing part (110) can be either of 0 or non 0.

The control section (150) calculates the terminal velocity form mathematical formula 9 by using the measured time and velocity (t1, v1), (t2, v2) and (t3, v3) as described in detail before. In the other words, the system of 3 equations of mathematical formula 11 as follows.

$$v1 = A - Be^{-\frac{t1}{\tau}}$$
$$v2 = A - Be^{-\frac{t2}{\tau}}$$
$$v3 = A - Be^{-\frac{t3}{\tau}}$$
(Here, $A = v_f$, $B = v_f - v_0$) Mathematical formula 11

It is not easy to obtain solution from said system of 3 equations of mathematical formula 11 since it includes the natural logarithm function. Accordingly, transform the mathematical formula 9 by integrating into the function of moving distance with respect to the time as shown in mathematical formula 12.

Mathematical Formula 12

$$v(t) = v_f - (v_f - v_0)e^{-\frac{t}{\tau}} = A - Be^{-a}$$
$$\left(\text{Here, }, C = \frac{1}{\tau}\right)$$

In addition, when the function of moving distance with respect to the time is L(t), the mathematical formula 13 and 14 can be expressed as follows.

$$L(t) = \int_0^t v(t)\,dt =$$ Mathematical formula 13
$$\int_0^t (A - Be^{-a})\,dt = At + \frac{B}{C}e^{-a} - \frac{B}{C}$$
$$Be^{-a} = CL(t) - ACt + B$$ Mathematical formula 14

And, when said mathematical formula 14 is substituted into mathematical formula 13, it is expressed as mathematical formula 15.

$$v(t)=(A-B)+ACt-CL(t)$$ Mathematical formula 15

L=L1 when t=t1, L=L2 and v=v2 when t=t2, L=L3 and v=v3 when t=t3 are substituted into said mathematical formula 15 and summarized, the system of 3 equations as shown in mathematical formula 16 is derived.

$$v1=(A-B)+ACt1-CL1$$
$$v2=(A-B)+ACt2-CL2$$
$$v3=(A-B)+ACt3-CL3$$ Mathematical formula 16

And, if A (Namely, the terminal velocity, $v_f$) is obtained from said mathematical formula 16, it is shown as mathematical formula 17.

Mathematical formula 17

$$v_f = A = \frac{v1(L2-L3)+v2(L3-L1)+v3(L1-L2)}{v1(t2-t3)+v2(t3-t1)+v3(t1-t2)}$$

As described in detail, the control section measures the terminal velocity of a particular gas based on the light detection signal (Namely, the electric signal corresponding to the detected light quantity) provided from at least one gas detecting section (130a, 130b and 130c)

The display section (160) expresses the gas flow velocity data based on the control of the control section (150).

The communication interface section (170) may be configured with the wired or wireless telecommunication interface and it transmits the measured gas flow velocity data based on the control of the control section (150).

A gas flow velocity measuring method may include further the gas guide section (180) and fixing part (190) depending on the manufacturing type.

For example, in case of manufacturing a gas flow velocity measuring method in easy shape, it may include the gas guide section (180) as depicted in FIG. 8. At least one of the gas detecting section (130am 130b and 130c) may be installed to the position wherein it emits the light to the gas flowing into said gas guide section (180) and to detect the emitted light. A gas processing part (110) may be installed at the position wherein a physical disturbance is created on the gas flowing into the gas guiding part (180). Here, said gas guiding part (180) may be formed in open type at both ends and the type of the gas guide section is not restricted if the gas flow pressure in the gas guide section (180) is same with the external gas flow pressure of gas guide section (180) owing to the same cross sectional area of the gas flow at both ends.

In addition, in case of manufacturing for movable gas flow velocity meter, said gas guide section (180) of the gas flow velocity meter may be fixed at the points for gas flow measuring such as chimney and it may further include the fixing part (190).

FIG. 10 is a flow chart showing a gas flow velocity measuring method according to an embodiment of present invention. It is depicted by taking an example of measuring the gas flow velocity using 3 gas detecting sections.

With reference to FIG. 10, firstly, the gas processing part disturbs the flowing gas at the time t0 (Step 210). Here, said disturbance may be created by the insertion of indicating gas or vortex for example.

Later, the $1^{st}$ gas detecting section located at the distance off, L1 from the gas processing part emits and detects the light with the wavelength absorptive to the gas to be measured at the time, t1 and provides the $1^{st}$ electric signal corresponding to this and the control section calculates the velocity, v1 based on said the $1^{st}$ electric signal (Step 220).

In addition, the $2^{nd}$ gas detecting section located at the distance off, L2 along the disturbed gas flow from the gas processing part emits and detects the light with the wavelength absorptive to the gas to be measured at the time, t2 and provides the $2^{nd}$ electric signal corresponding to this and the control section calculates the velocity, v2 based on said the $2^{nd}$ electric signal (Step 230).

In addition, the $3^{rd}$ gas detecting section located at the distance off, L3 along the disturbed gas flow from the gas processing part emits and detects the light with the wavelength absorptive to the gas to be measured at the time, t3 and provides the $3^{rd}$ electric signal corresponding to this and the control section calculates the velocity, v3 based on said the $3^{rd}$ electric signal (Step 240).

Later, the control section calculates the terminal velocity of a particular gas to be measured from mathematical formula 9 by using the time and velocity (t1, v1), (t2, v2) and (t3, v3) which are calculated through performing the step 220~240.

The calculation of a velocity for a particular gas based on the provided signal from 3 velocity detecting sections was depicted as an example in FIG. 10. The possibility of performing step 220~240 depicted in FIG. 10 can be decided corresponding to the quantity of gas detection pat since the quantity of gas detecting section can be added or reduced without restriction to only 3 units depending on the diversified measuring environment as it was described in FIG. 8. For example, in case that the velocity of a disturbance created from the gas processing part reaches to the terminal velocity within a certain error range, the terminal velocity of a particular gas can be calculated with a gas detecting section simply. Accordingly, the step 230~250 in the FIG. 10 can be configured not to be performed.

Hereinafter, the process of measuring the carbon dioxide out of the mixed gases is explained by taking an example of a gas flow velocity meter and a gas flow velocity measuring method according to the embodiment of present invention as described before.

The carbon dioxide ($CO_2$) is produced by the combustion of the fuel containing carbon. For example, in case of combusting methane ($CH_4$) by using the air ($O_2+N_2$), the reaction formula 1 is established.

The mixed gas of carbon dioxide, steam vapor and the nitrogen not engaged into the combustion are emitted after combustion of methane through chimney. If the methane is combusted imperfectly, the carbon monoxide is produced besides the carbon dioxide, nitrogen oxides (NOx) are emitted by engaging of nitrogen into the combustion when the combustion temperature is very high. In addition, the remained oxygen without engaging into the combustion is emitted too.

In case of combusting the methane, the emission gas includes carbon dioxide, steam vapor, nitrogen, oxygen, carbon monoxide and nitrogen oxides in general. Each gas is emitted through chimney. Here, the velocity of gas emitted through chimney is differed depending on the kind of gas. It is due to the difference of molecular weight of each gas as it was described.

The carbon dioxide has the property of strong absorption for the infrared of 4.26 μm. Accordingly, when the light source of the gas detecting section emits the infrared of 4.26 μm and light detector detects the emitted light, only the moving velocity of carbon dioxide can be measured. In addition, the emission quantity of carbon dioxide is calculated by measuring the concentration of carbon dioxide out of entire gases.

Although preferred embodiments of the present invention have been described for illustrative purposes, those skilled in the art will appreciate that various modifications, additions and substitutions are possible, without departing from the scope and sprit of the invention as disclosed in the accompanying claims.

What is claimed is:

1. A gas flow velocity meter, comprising:
   a gas processing part;
   a gas detecting section; and
   a control section;
   wherein the gas processing part is configured to
      inject an indication gas which is an identical species to a particular gas to be measured out of a mixed gas, and create a disturbance of concentration distribution in a flow of the mixed gas.

2. The gas flow velocity meter according to claim 1, wherein the indication gas has a higher concentration than the particular gas.

3. The gas flow velocity meter according to claim 2, wherein the gas processing part is configured to create a vortex or a turbulence as the disturbance in the flow of the mixed gas.

4. The gas flow velocity meter according to claim 1, further comprising:
a gas guide section;
wherein the gas processing part is configured to
inject the indication gas which is the identical species to the particular gas into the gas guide section, and
create the disturbance in the flow of the mixed gas.

5. The gas flow velocity meter according to claim 1, wherein the gas detecting section comprises:
a first gas detecting section located at a first position from a pre-set basic point and configured to
emit a first light with an absorptive wavelength of the particular gas to be measured out of the mixed gas, and
provide a first detection signal corresponding to the quantity of the first light at a first time;
a second gas detecting section located at a second position from the pre-set basic point and configured to
emit a second light with the absorptive wavelength of the particular gas, and
provide a second detection signal corresponding to the quantity of the second light at a second time; and
a third gas detecting section located at a third position from the pre-set basic point and configured to
emit a third light with the absorptive wavelength of the particular gas, and
provide a third detection signal corresponding to the quantity of the third light at a third time.

6. The gas flow velocity meter according to claim 5, wherein the control section is configured to
calculate a first velocity, a second velocity and a third velocity, based on the detection signals provided from the first, second, and third gas detecting sections, respectively, and
calculate a terminal velocity of the particular gas based on the first $1^{st}$ velocity, the $2^{nd}$ second velocity and the $3^{rd}$ third velocity of the particular gas using a formula:

$$v_f = \frac{v_1(L_2 - L_3) + v_2(L_3 - L_1) + v_3(L_1 - L_2)}{v_1(t_2 - t_3) + v_2(t_3 - t_1) + v_3(t_1 - t_2)},$$

where $v_f$ is the terminal velocity, $v_1$ is the first velocity, $v_2$ is the second velocity, $v_3$ is the third velocity, $L_1$ is the first position, $L_2$ is the second position, $L_3$ is the third position, $t_1$ is the first time, $t_2$ is the second time, $t_3$ is the third time.

7. A gas flow velocity measuring method, comprising:
creating a disturbance on a mixed gas flow including a particular gas to be measured;
emitting a light with absorptive wavelength of the particular gas to be measured;
detecting the emitted light and an intensity of the emitted light;
generating a detection signal corresponding to the intensity of the detected light; and
calculating a flow velocity of the particular gas based on the detection signal,
wherein the disturbance is created by injecting an indication gas, which is an identical species to the particular gas and has a higher concentration than the particular gas, into the mixed gas flow.

8. The gas flow velocity measuring method according to claim 7,
wherein the disturbance comprises a vortex or a turbulence in the mixed gas flow.

9. The gas flow velocity measuring method according to claim 7,
wherein the emitting comprises:
emitting the light with an absorptive wavelength of the particular gas, as a first light, from a first light source located at a point spaced from a point of disturbance by a first distance at a first time, wherein the point of disturbance is a location where the indication gas is injected into the mixed gas flow;
emitting the light with the absorptive wavelength of the particular gas, as a second light, from a second light source located at a point spaced from the point of disturbance by a second distance at a second time; and
emitting the light with the absorptive wavelength of the particular gas, as a third light, from a third light source located at a point spaced from the point of disturbance by a third distance at a third time, and
wherein the generating comprises:
generating a first detection signal corresponding to the intensity of the detected first light;
generating a second detection signal corresponding to the intensity of the detected second light; and
generating a third detection signal corresponding to the intensity of the detected third light.

10. The gas flow velocity measuring method according to claim 9,
wherein the calculating comprises:
calculating a first velocity, a second velocity, and a third velocity, based on the first, second and third detection signals, respectively; and
calculating a terminal velocity of the particular gas based on the $1^{st}$ first velocity, the $2^{nd}$ second velocity and the $3^{rd}$ third velocity using a formula:

$$v_f = \frac{v_1(L_2 - L_3) + v_2(L_3 - L_1) + v_3(L_1 - L_2)}{v_1(t_2 - t_3) + v_2(t_3 - t_1) + v_3(t_1 - t_2)},$$

where $v_f$ is the terminal velocity, $v_1$ is the first velocity, $v_2$ is the second velocity, $v_3$ is the third velocity, $L_1$ is the first distance, $L_2$ is the second distance, $L_3$ is the third distance, $t_1$ is the first time, $t_2$ is the second time, $t_3$ is the third time.

* * * * *